United States Patent
Zhang et al.

(10) Patent No.: US 9,588,791 B2
(45) Date of Patent: Mar. 7, 2017

(54) FLEXIBLE PHYSICAL FUNCTION AND VIRTUAL FUNCTION MAPPING

(71) Applicant: Altera Corporation, San Jose, CA (US)

(72) Inventors: Jiefan Zhang, San Jose, CA (US); Abdel Hafiz Rabi, High Wycombe (GB); Allen Chen, Cupertino, CA (US); Mark Jonathan Lewis, Marlow Bottom (GB)

(73) Assignee: Altera Corporation, San Jose, CA (US)

( * ) Notice: Subject to any disclaimer, the term of this patent is extended or adjusted under 35 U.S.C. 154(b) by 0 days.

(21) Appl. No.: 14/697,307

(22) Filed: Apr. 27, 2015

(65) Prior Publication Data

US 2016/0314007 A1    Oct. 27, 2016

(51) Int. Cl.
*G06F 9/455* (2006.01)
*G06F 9/54* (2006.01)
*G06F 15/78* (2006.01)

(52) U.S. Cl.
CPC ...... *G06F 9/45533* (2013.01); *G06F 9/45558* (2013.01); *G06F 9/54* (2013.01); *G06F 15/7867* (2013.01); *G06F 15/7889* (2013.01)

(58) Field of Classification Search
None
See application file for complete search history.

(56) References Cited

U.S. PATENT DOCUMENTS

| | | | |
|---|---|---|---|
| 2012/0284712 A1 | 11/2012 | Nimagadda et al. | |
| 2013/0254767 A1* | 9/2013 | Mizuno | G06F 9/455 718/1 |
| 2014/0229941 A1* | 8/2014 | Bert | G06F 9/45558 718/1 |
| 2016/0019176 A1* | 1/2016 | Challa | G06F 9/45558 710/117 |

OTHER PUBLICATIONS

Oracle: "Oracle VM Server for SPARC 2.2 Administration Guide", May 2012 (May 2012), pp. 90-105,XP055300619, Retrieved from the Internet: URL:https://docs.oracle.com/cd/E35434_01/pdf/E23807.pdf [retrieved on Sep. 7, 2016].
Sander Oliver et al: "A flexible interface architecture for reconfigurable coprocessors in embedded multicore systems using PCIe Single-root I/O virtualization", 2014 International Conference on Field-Programmable Technology (FPT), IEEE, Dec. 10, 2014 (Dec. 10, 2014), pp. 223-226, XP032762317, DOI: 10.1109/ FPT. 2014.7082780 [retrieved on Apr. 8, 2015].
Extended EP Search Report for EP Application No. 16166829 Mailed Sep. 16, 2016; 9 Pages.

* cited by examiner

*Primary Examiner* — Sisley Kim
(74) *Attorney, Agent, or Firm* — Fletcher Yoder, P.C.

(57) ABSTRACT

Techniques and mechanisms provide a flexible mapping for physical functions and virtual functions in an environment including virtual machines.

15 Claims, 7 Drawing Sheets

FLEXIBLE PHYSICAL FUNCTION AND VIRTUAL FUNCTION MAPPING

TECHNICAL FIELD

This disclosure generally relates to integrated circuits. More specifically, the disclosure relates to a flexible mapping between physical functions and virtual functions.

DESCRIPTION OF THE RELATED TECHNOLOGY

Network Functions Virtualization (NFV) allows for a platform including virtualized functions. In some NFV platforms, a processor may interface with a co-processor acceleration circuit providing additional functionality. The processor may be running multiple virtual machines (VMs), each accessing the additional functionality in the co-processor acceleration circuit by using a mapping of physical functions (PFs) and virtual functions (VFs). The mapping between PFs and VFs may allow the single co-processor acceleration circuit to be perceived as multiple resources available to the VMs.

In some devices, such as programmable devices providing the additional functionality for the co-processor acceleration, the functionality may be changed. Accordingly, a designer may wish for a more flexible mapping between PFs and VFs.

SUMMARY

The subject matter described herein provides a flexible mapping between physical functions and virtual functions in an environment including virtual machines.

Physical functions (PFs) may provide an interface to particular functionality. Virtual functions (VFs) may provide an interface for virtual machines (VMs) to access the functionality by mapping the VFs to PFs. The PF to VF mapping may be flexible to allow for particular scenarios to implement better resource utilization.

These and other features will be presented in more detail in the following specification and the accompanying figures, which illustrate by way of example.

DETAILED DESCRIPTION OF PARTICULAR EMBODIMENTS

Figure 1:
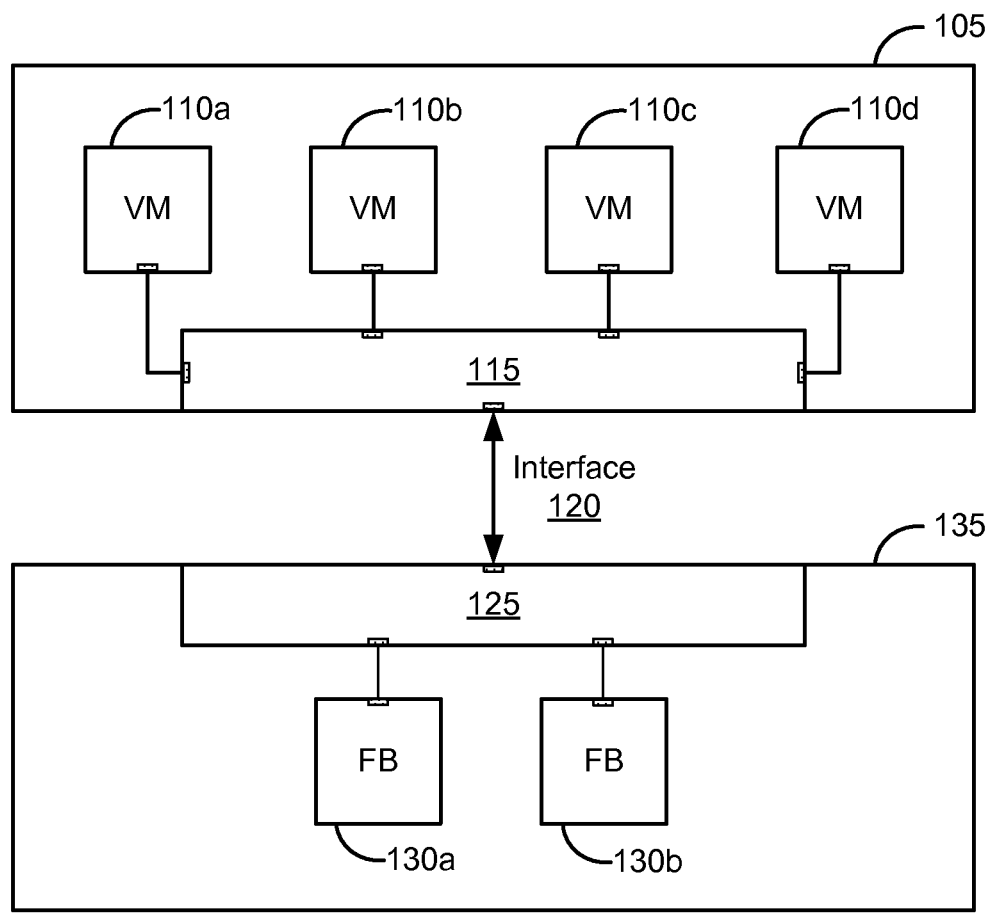
FIG. 1 illustrates an example of a co-processor environment in accordance with some implementations.

FIG. 1 illustrates an example of a co-processor environment in accordance with some implementations. The components in the co-processor environment may allow for a physical device to appear as multiple devices for use in multiple virtual machines (VMs). Each VM may emulate a computer system that can access the components in the co-processor environment.

For example, in FIG. 1, processor 105 may be a processor circuit (or multiple processor circuits operating together) running four virtual machines (VMs) 110a, 110b, 110c, and 110d. VMs 110a-d may be able to access function blocks 130a and 130b in co-processor 135 with interface 120. Interface 120 may be a Peripheral Component Interconnect Express (PCIe) interface used to send and receive data between processor 105 and co-processor 135. The data transmitted on interface 120 may be provided to and from processor I/O logic 115 and co-processor I/O logic 125.

In some implementations, processor I/O logic 115 and co-processor I/O logic 125 may include a variety of logical functionality allowing Single Root I/O Virtualization (SR-IOV), which may allow for PCIe devices on the PCIe interface to appear as multiple separate physical PCIe devices. For example, processor I/O logic 115 may include a PCIe SR-IOV root. Co-processor I/O logic 125 may include a variety of logic including a PCIe SR-IOV endpoint and virtualization management logic. Accordingly, components within co-processor 135 (i.e., at the endpoint of the SR-IOV PCIe interface) may appear as multiple separate physical PCIe devices to VMs 110a-d (i.e., at the root of the SR-IOV PCIe interface). As a result, each VM 110a-d may be able to emulate a computer system with co-processor 135.

For example, function block 130a may appear as four separate function blocks to VMs 110a-d despite only having a single, physical instantiation. As another example, if function block 130a provides logic implementing a network interface controller (NIC), then it may be presented as four separate NICs, one for each of VMs 110a-d. The NIC may be a full-featured and configurable PCIe function that may be discovered, managed, etc. just like a physical PCIe device. A physical function (PF) implemented by co-processor 135 may provide access to the NIC. Each of the presented four separate NICs may be a virtual function (VF) of the full-featured NIC that may receive and provide data, but may lack the full-featured aspect of the PF. The VF implemented by co-processor 135 may allow for a VM to access a PF and the physical PCIe device through the VF. Likewise, function block 130b may also be presented as four separate VFs to VMs 110a-110d.

Accordingly, each PF can be an interface to a particular function (e.g., NIC for function block 130a) with multiple VFs as interfaces for the VMs to use the particular functions. In one example, function block 130a may provide the functionality of a NIC as a PF with up to 16 VFs for the NIC functionality for VMs to utilize, while function block 130b may provide a different functionality with a different number of VFs (e.g., 128) for VMs to utilize. As a result, a mapping may include a function block (e.g., function block 130a as a NIC) corresponding to a PF, the PF may correspond to VFs, with each VF corresponding to a VM.

In some systems, the mapping between PFs and VFs may be fixed. For example, if function block 130a is a NIC, then each VF mapped to a corresponding PF associated with function block 130a may represent a NIC. However, in systems using programmable devices (e.g., field programmable gate arrays, complex programmable logic devices, etc.), the functionality corresponding to the PFs may be changed. For example, function block 130a may be reconfigured from a NIC to an Internet Small Computer System Interface (iSCSI). Accordingly, the functionality mapped with the PF may change, and therefore, the number of VFs or the VFs associated to VMs 110a-110d may change, for example, by having a different subset of VMs 110a-110d be provided access to function block 130a. Additionally, new VMs may be started which may need VFs to map to new PFs, and therefore, be provided access to certain functionality. Moreover, new function blocks may be configured in co-processor 135 and may need to be associated with corresponding PFs and VFs. Accordingly, a flexible PF-VF mapping may be useful in some systems.

A flexible PF-VF mapping also may allow for a better balanced dataflow. For example, any combination of functionality provided by co-processor 135 may be mapped to particular PFs and the PFs may be mapped to VFs to provide flexible mappings. Accordingly, some subset of functionality provided by co-processor 135 may be provided by a first PF and a second subset of functionality may be provided by a second PF, with some (or none) overlap of functionality between the two PFs. For example, VFs may be mapped to PFs based on characteristics of the VMs. As another example, each PF may be associated with different clients and each VF of the VMs of each client may be mapped to a PF such that each client may have its own PF. This type of mapping may allow more control over dataflow because one PF (associated with one client) may be provided a higher priority to access the function blocks within co-processor 135 over another PF (associated with a second client). As a result, rather than representing specific functionality, each PF may represent individual clients or groups of clients.

Figure 2:
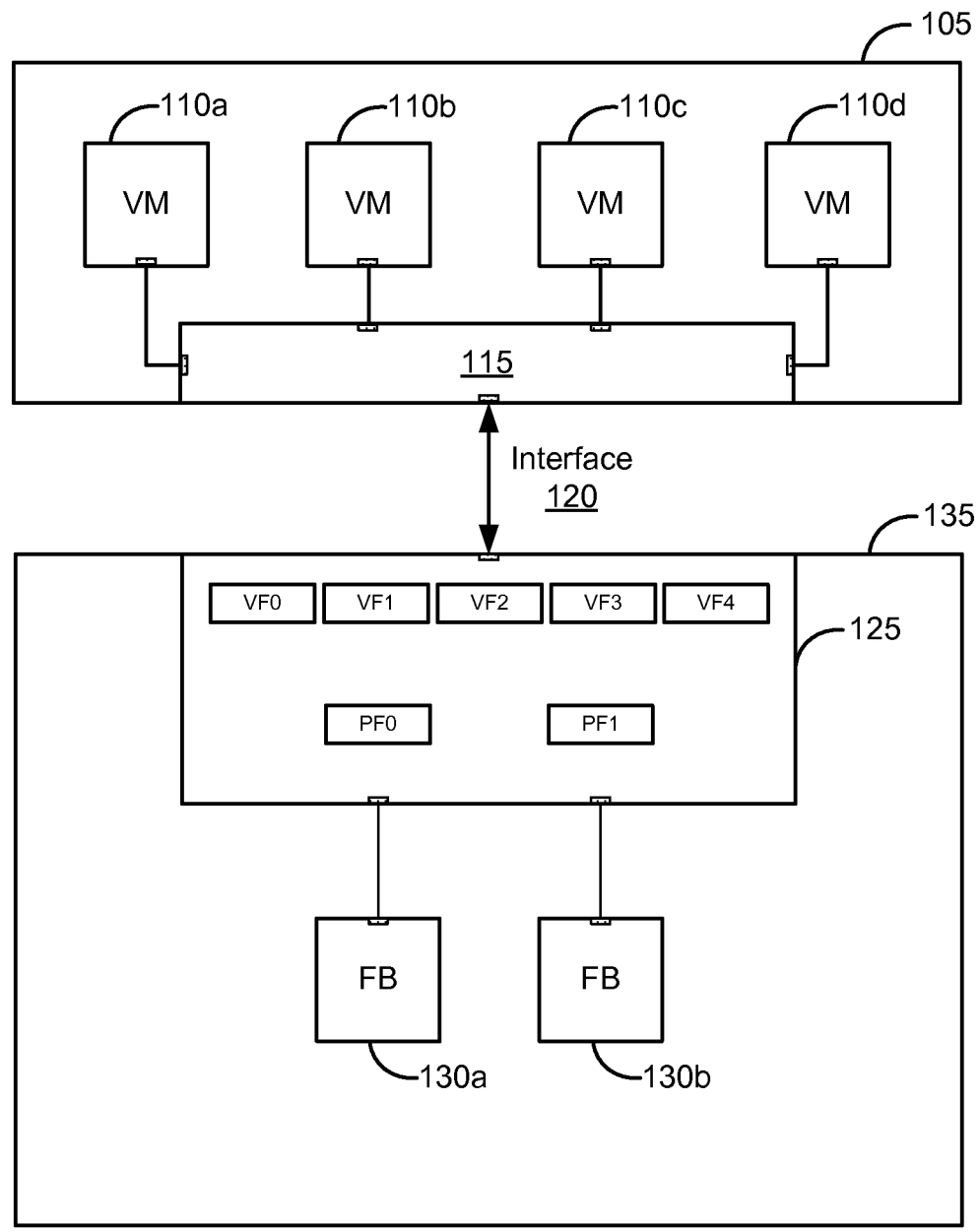
FIG. 2 illustrates an environment providing flexible PF-VF mapping in accordance with some implementations.

FIG. 2 illustrates an environment providing flexible PF-VF mapping in accordance with some implementations. In FIG. 2, co-processor I/O logic 125 includes management logic for managing the relationships between function blocks, PFs, VFs, and VMs. For example, in FIG. 2, PF0 (i.e., a physical function) may be associated with function block 130a and PF1 (i.e., another physical function) may be associated with function block 130b. Accordingly, PF0 may provide the functionality provided by function block 130a to the VFs mapped to it. Likewise, PF1 may provide the functionality provided by function block 130b to the VFs mapped to it. In FIG. 2, VF0-4 may be virtual functions for VMs 110a-d to communicate with in order to access function blocks 130a or 130b. That is, VF0-4 may be mapped to PF0 and PF1 to allow for VMs 110a-d to use the logic provided by function blocks 130a and 130b. For example, VM 110a may connect to 2 VFs: VF0 and VF1. VF0 may connect to PF0. VF1 may connect to PF1. Since PF0 provides access to the logic of function block 130a and PF1 provides access to the logic of function block 130b, VM 110a may have access to both function blocks 130a and 130b.

Figure 3:
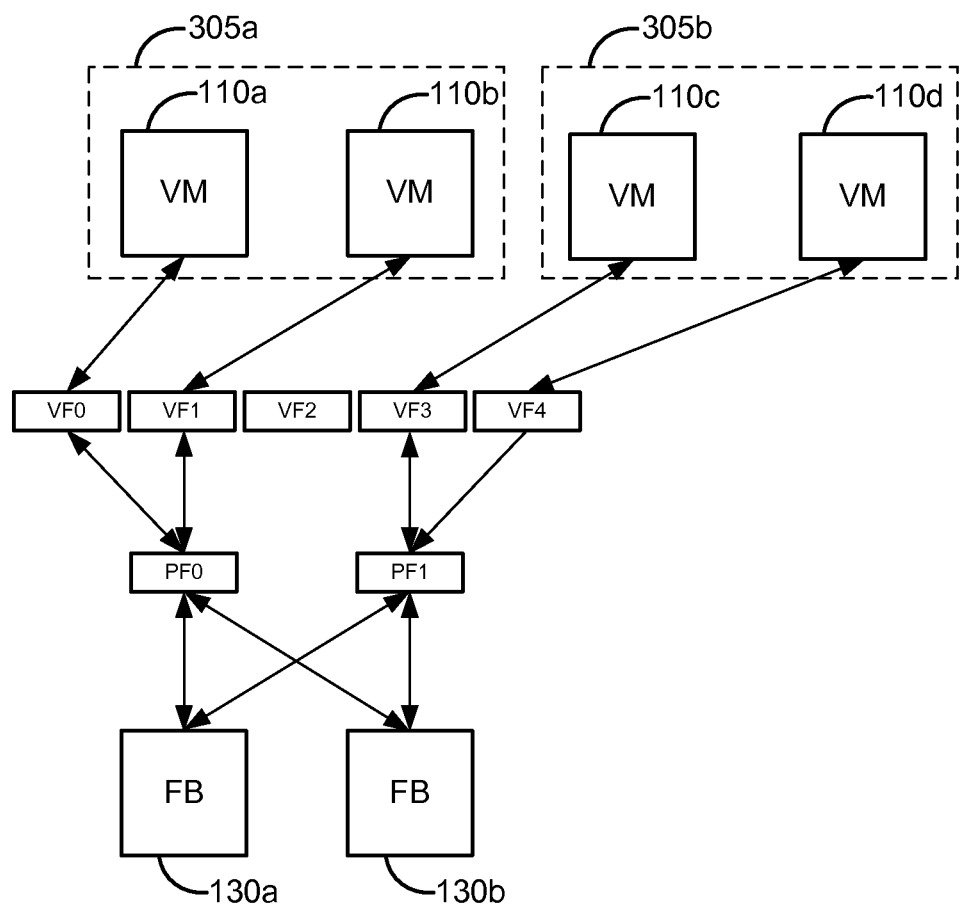
FIG. 3 illustrates a PF-VF mapping in accordance with some implementations.

As previously discussed, a flexible PF-VF mapping may allow for different setups for the mappings. For example, characteristics of the VMs (e.g., being associated with a particular customer) may be used for the mapping. FIG. 3 illustrates a PF-VF mapping in accordance with some implementations. In FIG. 3, the PF-VF mapping includes VMs 110a and 110b of customer 305a and VMs 110c and 110d of customer 305b. That is, different customers of the co-processor environment may have VMs on the same processor 105. Each of VMs 110a-d map to a corresponding VF0, VF1, VF3, and VF4. VF0 and VF1 map to PF0. VF3 and VF4 map to PF1. Both PF0 and PF1 map to function blocks 130a and 130b. Accordingly, in the mapping of FIG. 3, each VM may be provided the functionality provided by the logic of function blocks 130a and 130b because the function blocks both map to each of PF0 and PF1. Since each of customers 305a and 305b have their VMs mapped to VFs mapped to specific PFs (e.g., all of the VFs for the VMs of customer 305a map to PF0), the PFs can be associated with a priority order (e.g., requests received at PF0 may have a higher priority, and therefore serviced prior to requests received at PF1) and all of the VMs of the customers can be organized in terms of priority by having the PFs ordered in a particular priority order. In some implementations, the priority may be managed in higher management or orchestration layers.

In some implementations, when new VMs of a customer are instantiated (e.g., when another computer system needs to be emulated), then the VMs may be mapped to newly-created VFs and the newly-created VFs may be mapped to the PFs for the customer. For example, in FIG. 3, if a new VM of customer 305a is instantiated, then it may be mapped to VF2, which may be mapped to PF0, and therefore also provided the functionality of function blocks 130a and 130b. If a new VM of customer 305b is instantiated, then it may be mapped to a new VF, which may then be mapped to PF1 to also provide the functionality of function blocks 130a and 130b to the new VM.

In some implementations, the virtualization management logic of co-processor I/O logic 125 may recognize that VF2 is associated with customer 305a and then assign it to PF0. In some implementations, co-processor I/O logic 125 may receive a customer identifier (e.g., each customer may have a unique identification that may be used with all of its VMs) data from processor 105 indicating that a newly-instantiated VM associated with customer 305a has been instantiated. Accordingly, co-processor I/O logic 125 may then assign it to a new VF and assign that new VF to the correct PF. As a result, the virtualization management logic may track which PFs and VFs are assigned to each other.

In some implementations, each PF may represent all capabilities of co-processor 135. For example, if co-processor 135 is a programmable device (e.g., an FPGA), then it may include hard logic functionality (i.e., fixed circuitry providing fixed functionality), soft logic functionality (i.e., logic configured within the FPGA to provide functionality), and inputs/outputs (I/Os) as resources that may be available to VMs that are mapped to VFs mapped to a PF.

In some implementations, each PF may represent a combination of resources on co-processor 135. For example, PF0 may provide 100% of the available functionality of co-processor 135 and PF1 may provide 50% of the available functionality of co-processor 135. Accordingly, in the environment of FIG. 3, each VM of customer 305a may be able to access the full range of available functionality of co-processor 135, but each VM of customer 305b may be able to access only a subset of the functionality available to the VMs of customer 305a.

Accordingly, each PF may represent any combination of capabilities of co-processor 135 and any VF mapped to the PFs may have the combination of capabilities of the corresponding PF it is mapped to. For example, if function block 130a provides functionality for a NIC and function block 130b provides functionality for iSCSI, then a VM needing access to both function blocks 130a and 130b may be mapped to a VF mapped to a PF mapped to both functionalities.

In some implementations, the logic provided by function blocks 130a and 130b may change. For example, if co-processor 135 is an FPGA (or other programmable device), then function block 130a may be reconfigured from one functionality to another functionality. That is, co-processor 135 may be partially reconfigured such that the functionality of function block 130*a* may be changed while the functionality of function block 130*b* remains the same and is still accessible to VMs.

Figure 4:
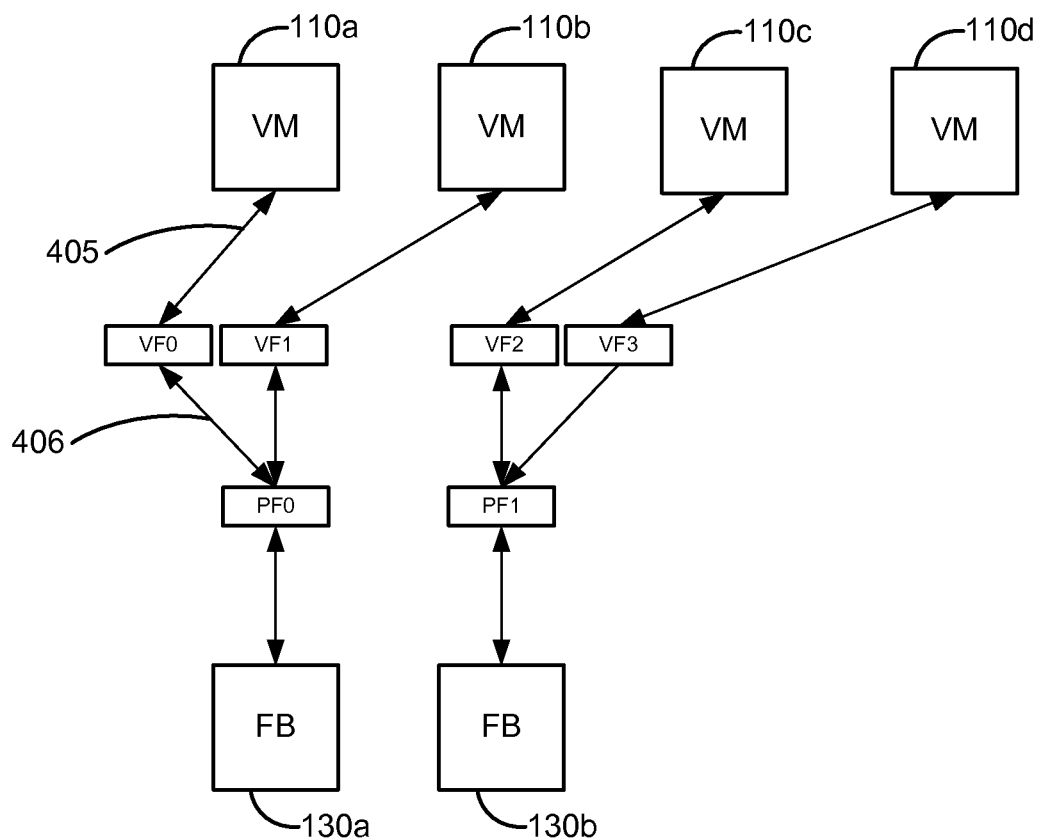
FIG. 4 illustrates another PF-VF mapping in accordance with some implementations.

As an example, FIG. 4 illustrates another PF-VF mapping in accordance with some implementations. In FIG. 4, VM 110*a* is mapped to VF0 (as indicated by association 405). VF0 is mapped to PF0, which is mapped to function block 130*a*. Function block 130*a* may provide the functionality for a cryptography algorithm. However, function block 130*a* may be reconfigured to provide a compression algorithm (and no longer provide the cryptography algorithm). The virtualization management logic may receive data indicating that function block 130*a* has begun reconfiguration from the cryptography algorithm to the compression algorithm, and therefore, may block all traffic (i.e., requests to or transmissions from) associated with function block 130*a* as function block 130*a* is being reconfigured to provide the compression algorithm. When function block 130*a* has finished being reconfigured, the traffic may be allowed to resume. For example, the virtualization management logic may inform VMs that function block 130*a* has finished reconfiguring, and therefore, new requests may be provided.

In some implementations, the PF-VF mappings may change as a result of reconfiguring a function block (e.g., reconfiguring function block 130*a* from the cryptography algorithm to the compression algorithm). For example, in FIG. 4, VM 110*a* may be restricted from accessing the compression algorithm, but allowed to access the cryptography algorithm. Accordingly, in FIG. 4, while function block 130*a* provides the cryptography algorithm, the mappings may be appropriate. However, when function block 130*a* is reconfigured to the compression algorithm, the virtualization management logic may change the mappings, for example, by removing association 405 such that VM 110*a* no longer has access to a VF mapped to PF0 providing access to function block 130*a* when it is configured with the compression algorithm. In another example, association 406 may be removed such that VF0 is no longer mapped to PF0, and therefore, ensuring that VM 110*a* also no longer has access to function block 130*a*. In other mappings, the association between a PF and the function block itself may be updated (e.g., added or removed).

As a result, the mappings between VMs to VFs, VFs and PFs, and PFs and function blocks may be added or removed. For example, in FIG. 4, association 405 representing a mapping of VM 110*a* to VF0 may be removed and a new mapping of VM 110*a* to another VF may be generated such that VM 110*a* is provided access to another function block (e.g., FB 130*b* instead of FB 130*a* by mapping VM 110*a* to VF2 or VF3). In some implementations, a new VF can be generated and VM 110*a* may be mapped to the new VF, or VM 110*a* may be mapped to an existing VF. In another example, association 406 may be removed and a new mapping of VF0 to another PF (e.g., PF1) may be provided to give VM 110*a* access to function block 130*b*. In another example, the mapping between PF0 to function block 130*a* itself may be removed and a mapping between PF0 to function block 130*b* may be generated. In this scenario, both VM 110*a* and VM 110*b* may no longer have access to function block 130*a*. In some implementations, multiple mappings may be adjusted. For example, the mappings between VFs and PFs, and PFs to function blocks may both be modified. Accordingly, mappings between VMs and VFs, VFs and PFs, and PFs and function blocks may be removed and/or added.

In some implementations, certain customers and their corresponding VMs may be restricted from certain functionalities. Accordingly, as a function block is reconfigured, the virtualization management logic may recognize that a mapping of a VM to the function block (including the VM to VF and VF to PF mappings) may need to be updated, for example, by deleting an association such that the VM no longer has access to the particular function block.

In some implementations, extra access controls may be implemented within the virtualization management logic, function blocks, or both. The access controls may allow different VFs mapped to the same PF to have access to different functionality of co-processor 135. For example, if a function block provides both packet processing and traffic management logic, one VF may be allowed access to both packet processing and traffic management logic while another VF may be allowed only access to the packet processing logic even though it may be mapped to a PF providing access to both the packet processing and traffic management logic.

Figure 5:
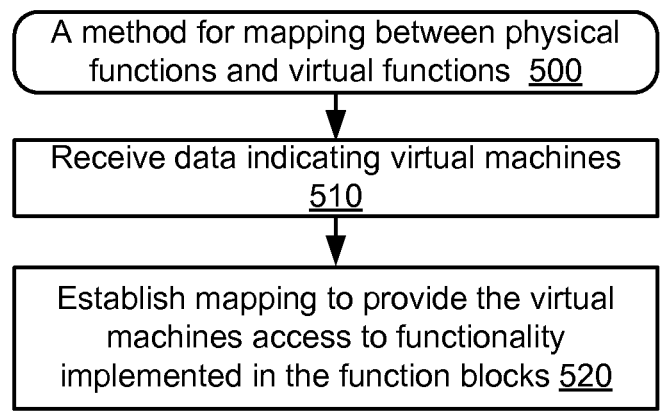
FIG. 5 is a flowchart illustrating a process flow for a flexible PF-VF mapping in accordance with some implementations.

FIG. 5 is a flowchart illustrating a process flow for a flexible PF-VF mapping in accordance with some implementations. In method 500, at block 510, a virtualization management circuit may receive data indicating virtual machines to be provided access to functionality implemented in function blocks. For example, a user may specify a particular mapping of VMs in a graphical user interface (GUI) in a software-based electronic design automation (EDA) tool implemented by the processor circuit of FIG. 7 and the appropriate mappings between the VMs, VFs, PFs, and function block may be established. As another example, the virtualization management circuit may receive data from processor 105 indicating VMs, characteristics (e.g., customer identifier), analyze function blocks, etc. At block 520, the virtualization management circuit may establish mapping to provide the virtual machines access to functionality implemented in the function blocks.

Figure 6:
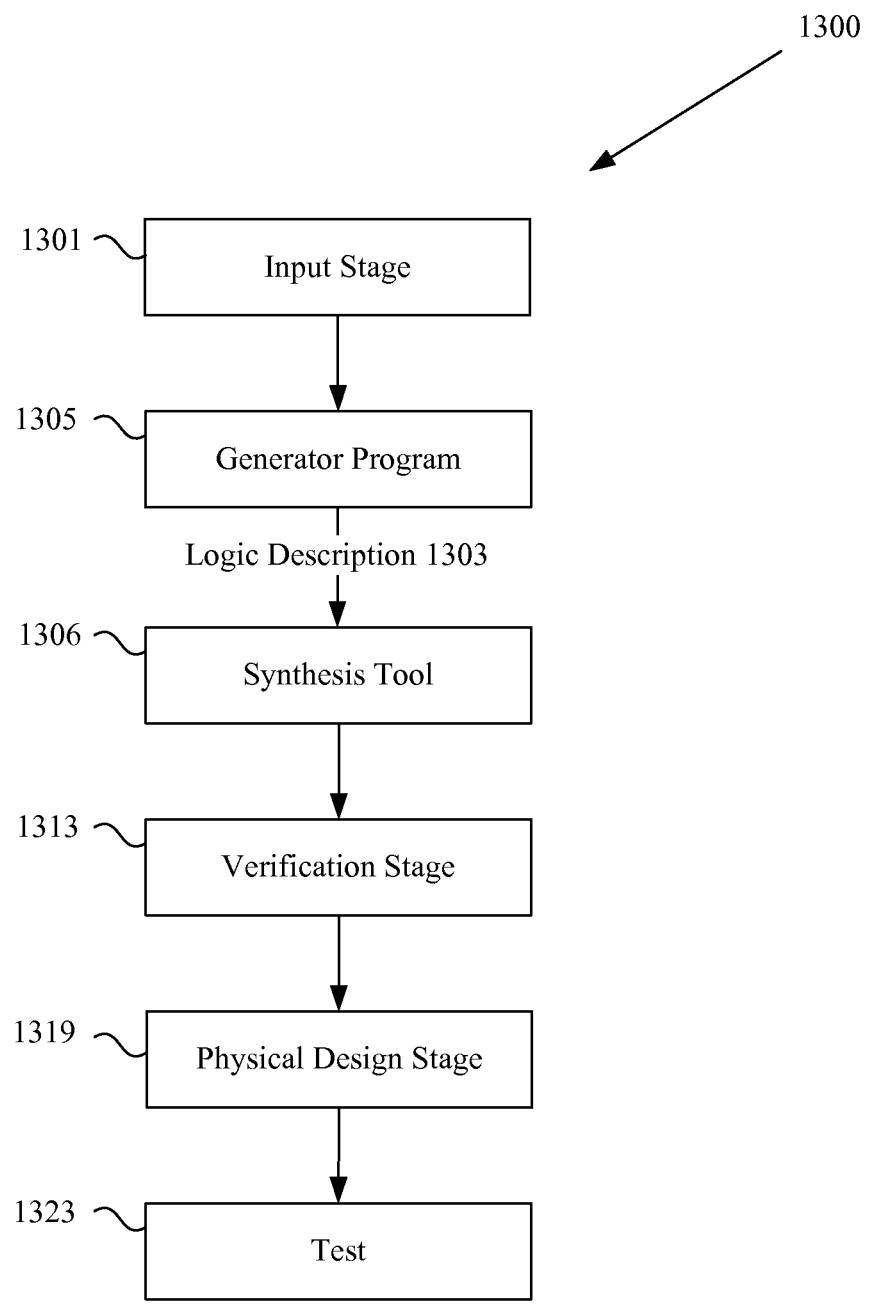
FIG. 6 illustrates a technique for implementing a programmable chip.

In some implementations, the techniques disclosed herein may be implemented with one or more programmable chips. For example, co-processor 135 may be implemented within a field programmable gate array (FPGA) or other programmable chip. FIG. 6 illustrates a technique for implementing a programmable chip. An input stage 1301 receives selection information typically from a user for logic such as a processor core as well as other components to be implemented on an electronic device. In one example, the input received is in the form of a high-level language program. A generator program 1305 creates a logic description and provides the logic description along with other customized logic to any of a variety of synthesis tools, place and route programs, and logic configuration tools to allow a logic description to be implemented on an electronic device.

In one example, an input stage 1301 often allows selection and parameterization of components to be used on an electronic device. The input stage 1301 also allows configuration of hard coded logic. In some examples, components provided to an input stage include intellectual property functions, megafunctions, and intellectual property cores. The input stage 1301 may be a graphical user interface using wizards for allowing efficient or convenient entry of information. The input stage may also be a text interface or a program reading a data file such as a spreadsheet, database table, or schematic to acquire selection information. The input stage 1301 produces an output containing information about the various modules selected. At this stage, the user may enter security information about individual components that needs to be isolated. For example, different levels of component security and which components are allowed to communicate with each other may be entered.

In typical implementations, the generator program 1305 can identify the selections and generate a logic description with information for implementing the various modules. The generator program 1305 can be a Perl script creating HDL files such as Verilog, Abel, VHDL, and AHDL files from the module information entered by a user. In one example, the generator program identifies a portion of a high-level language program to accelerate. The other code is left for execution on a processor core. According to various embodiments, the generator program 1305 identifies pointers and provides ports for each pointer. One tool with generator program capabilities is System on a Programmable Chip (SOPC) Builder available from Altera Corporation of San Jose, Calif. The generator program 1305 also provides information to a synthesis tool 1307 to allow HDL files to be automatically synthesized. In some examples, a logic description is provided directly by a designer. Hookups between various components selected by a user are also interconnected by a generator program. Some of the available synthesis tools are Leonardo Spectrum, available from Mentor Graphics Corporation of Wilsonville, Oreg. and Synplify available from Synplicity Corporation of Sunnyvale, Calif. The HDL files may contain technology specific code readable only by a synthesis tool. The HDL files at this point may also be passed to a simulation tool.

As will be appreciated by one of skill in the art, the input stage 1301, generator program 1305, and synthesis tool 1307 can be separate programs. The interface between the separate programs can be a database file, a log, or simply messages transmitted between the programs. For example, instead of writing a file to storage, the input stage 1301 can send messages directly to the generator program 1305 to allow the generator program to create a logic description. Similarly, the generator program can provide information directly to the synthesis tool instead of writing HDL files. Similarly, input stage 1301, generator program 1305, and synthesis tool 1307 can be integrated into a single program.

A user may select various modules and an integrated program can then take the user selections and output a logic description in the form of a synthesized netlist without intermediate files. Any mechanism for depicting the logic to be implemented on an electronic device is referred to herein as a logic description. According to various embodiments, a logic description is an HDL file such as a VHDL, Abel, AHDL, or Verilog file. A logic description may be in various stages of processing between the user selection of components and parameters to the final configuration of the device. According to other embodiments, a logic description is a synthesized netlist such as an Electronic Design Interchange Format Input File (EDF file). An EDF file is one example of a synthesized netlist file that can be output by the synthesis tool 1307.

A synthesis tool 1307 can take HDL files and output EDF files. Tools for synthesis allow the implementation of the logic design on an electronic device. Some of the available synthesis tools are Leonardo Spectrum, available from Mentor Graphics Corporation of Wilsonville, Oreg. and Synplify available from Synplicity Corporation of Sunnyvale, Calif. Various synthesized netlist formats will be appreciated by one of skill in the art.

A verification stage 1313 typically follows the synthesis stage 1307. The verification stage checks the accuracy of the design to ensure that an intermediate or final design realizes the expected requirements. A verification stage typically includes simulation tools and timing analysis tools. Tools for simulation allow the application of inputs and the observation of outputs without having to implement a physical device. Simulation tools provide designers with cost effective and efficient mechanisms for both functional and timing verification of a design. Functional verification involves the circuit's logical operation independent of timing considerations. Parameters such as gate delays are disregarded.

Timing verification involves the analysis of the design's operation with timing delays. Setup, hold, and other timing requirements for sequential devices such as flip-flops are confirmed. Some available simulation tools include Synopsys VCS, VSS, and Scirocco, available from Synopsys Corporation of Sunnyvale, Calif. and Cadence NC-Verilog and NC-VHDL available from Cadence Design Systems of San Jose, Calif. After the verification stage 1313, the synthesized netlist file can be provided to physical design tools 1319 including place and route and configuration tools. A place and route tool locates logic cells on specific logic elements of a target hardware device and connects wires between the inputs and outputs of the various logic elements in accordance with logic and security provided to implement an electronic design. According to various embodiments of the present invention, the place and route tool may perform the techniques of the present invention to implement the various security requirements and rules as defined by the user. The iterative technique may be transparent to the user, but the resulting device can be physically tested at 1323.

For programmable logic devices, a programmable logic configuration stage can take the output of the place and route tool to program the logic device with the user selected and parameterized modules. According to various embodiments, the place and route tool and the logic configuration stage are provided in the Quartus Development Tool, available from Altera Corporation of San Jose, Calif. As will be appreciated by one of skill in the art, a variety of synthesis, place and route, and programmable logic configuration tools can be used using various techniques of the present invention.

As noted above, different stages and programs can be integrated in a variety of manners. According to one embodiment, the input stage 1301, the generator program 1305, the synthesis tool 1307, the verification tools 1313, and physical design tools 1319 are integrated into a single program. The various stages are automatically run and transparent to a user. The program can receive the user-selected modules, generate a logic description depicting logic for implementing the various selected modules, and implement the electronic device. As will be appreciated by one of skill in the art, HDL files and EDF files are mere examples of a logic description. Other file formats as well as internal program representations are other examples of a logic description.

Figure 7:
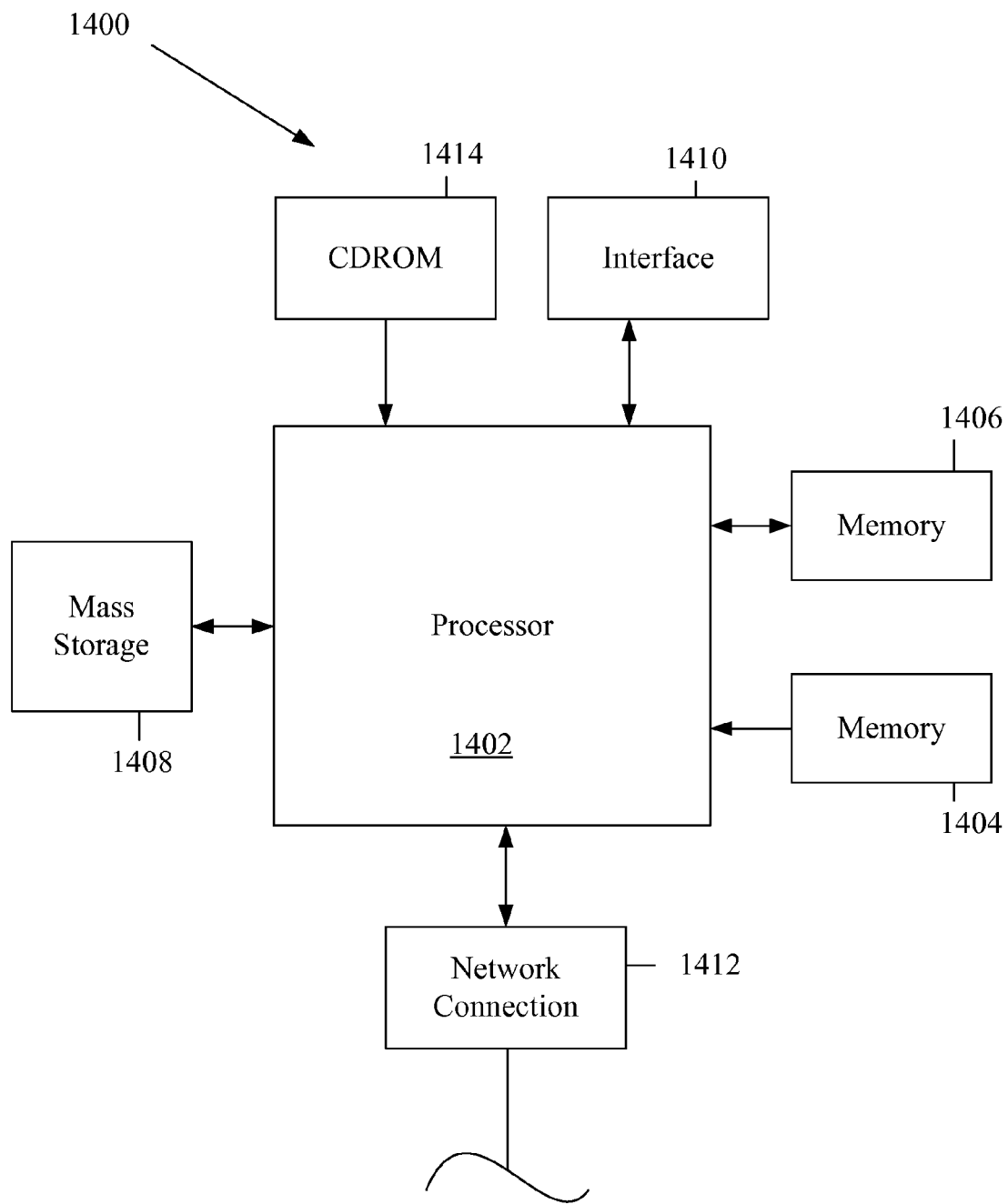
FIG. 7 illustrates one example of a computer system.

FIG. 7 illustrates one example of a computer system implementing the techniques disclosed herein. The computer system 900 includes any number of processors 1402 (also referred to as central processing units, or CPUs) that are coupled to devices including memory 1406 (typically a random access memory, or "RAM"), memory 1404 (typically a read only memory, or "ROM"). The processors 1402 can be configured to generate an electronic design. As is well known in the art, memory 1404 acts to transfer data and instructions uni-directionally to the CPU and memory 1406 are used typically to transfer data and instructions in a bi-directional manner.

Both of these memory devices may include any suitable type of the computer-readable media described above. A mass storage device 1408 is also coupled bi-directionally to CPU 1402 and provides additional data storage capacity and may include any of the computer-readable media described above. The mass storage device 1408 may be used to store programs, data and the like and is typically a secondary storage medium such as a hard disk that is slower than memory. The mass storage device 1408 can be used to hold a library or database of prepackaged logic or intellectual property functions, as well as information on generating particular configurations. It will be appreciated that the information retained within the mass storage device 1408, may, in appropriate cases, be incorporated in standard fashion as part of memory 1406 as virtual memory. A specific mass storage device such as a CD-ROM 1414 may also pass data uni-directionally to the CPU.

CPU 1402 is also coupled to an interface 1410 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. The CPU 1402 may be a design tool processor. Finally, CPU 1402 optionally may be coupled to a computer or telecommunications network using a network connection as shown generally at 1412. With such a network connection, it is contemplated that the CPU might receive information from the network, or might output information to the network in the course of performing the above-described process steps. It should be noted that the system 1400 might also be associated with devices for transferring completed designs onto a programmable chip. The above-described devices and materials will be familiar to those of skill in the computer hardware and software arts.

Although many of the components and processes are described above in the singular for convenience, it will be appreciated by one of skill in the art that multiple components and repeated processes can also be used to practice the techniques of the present invention.

While particular embodiments of the invention have been particularly shown and described with reference to specific embodiments thereof, it will be understood by those skilled in the art that changes in the form and details of the disclosed embodiments may be made without departing from the spirit or scope of the invention. For example, embodiments of the present invention may be employed with a variety of components and should not be restricted to the ones mentioned above. It is therefore intended that the invention be interpreted to include all variations and equivalents that fall within the true spirit and scope of the present invention.

What is claimed is:

1. A method for mapping between physical functions and virtual functions, the method comprising:
receiving, by a virtualization management unit, data indicating virtual machines to be provided access to hardware functionality implemented in function blocks; and
establishing, by the virtualization management unit, a mapping between the virtual machines and the function blocks to provide the virtual machines access to the hardware functionality implemented in the function blocks, the mapping indicating each virtual machine associated with a corresponding virtual function, each virtual function associated with one or more of the physical functions, and each of the one or more physical functions associated with the one or more function blocks, wherein the mapping is based on characteristics of the virtual machines, wherein the one or more physical functions includes a first physical function and a second physical function, the first physical function mapped to a first function block providing a first hardware functionality, the second physical function mapped to the first function block and a second function block, the second function block providing a second hardware functionality;
reconfiguring the second function block to provide a third hardware functionality, the third hardware functionality being different than the second hardware functionality; and
updating, by the virtualization management unit, the mapping based on the reconfiguration of the second function block to provide the third hardware functionality.

2. The method of claim 1, wherein updating the mapping includes modifying a mapping of a virtual machine associated with a first virtual function such that the virtual machine is associated with a second virtual function.

3. The method of claim 1, wherein updating the mapping includes modifying a mapping of a first virtual function associated with a first physical function such that the first virtual function is associated with a second physical function.

4. The method of claim 1, wherein updating the mapping includes modifying the mapping of the first physical function such that the first physical function is associated with the second function block.

5. The method of claim 1, wherein the characteristics of the virtual machines include a customer identifier.

6. The method of claim 5, wherein virtual machines associated with a first customer identifier are mapped to a first group of virtual functions, the first group of virtual functions mapped to the first physical function, and virtual machines associated with a second customer identifier are mapped to a second group of virtual functions, the second group of virtual functions mapped to the second physical function.

7. The method of claim 6, wherein the first physical function is associated with a first priority, the second physical function is associated with a second priority, the first priority being a higher priority than the second priority.

8. The method of claim 1, wherein the virtualization management unit is implemented by a co-processor circuit, and the virtual machines are implemented by a processor circuit.

9. A system comprising:
a virtualization management circuit to receive data indicating virtual machines to be provided access to hardware functionality implemented in function blocks, and to generate a mapping between the virtual machines and the function blocks to provide the virtual machines access to the hardware functionality implemented in the function blocks, the mapping indicating each virtual machine associated with a corresponding virtual function, each virtual function associated with one or more of the physical functions, and each of the one or more physical functions associated with the one or more function blocks, wherein the mapping is based on characteristics of the virtual machines, wherein the one or more physical functions includes a first physical function and a second physical function, the first physical function mapped to a first function block, the second physical function mapped to the first function block and a second function block, and wherein the first function block provides a first hardware functionality and the second function block provides a second hardware functionality, and the virtualization management circuit is to update the mapping based on a reconfiguration of the second function block to provide a third hardware functionality different than the second hardware functionality.

10. The system of claim 9, wherein the characteristics of the virtual machines include a customer identifier.

11. The system of claim 10, wherein virtual machines associated with a first customer identifier are mapped to a first group of virtual functions, the first group of virtual functions mapped to the first physical function, and virtual machines associated with a second customer identifier are mapped to a second group of virtual functions, the second group of virtual functions mapped to the second physical function.

12. The system of claim 11, wherein the first physical function is associated with a first priority, the second physical function is associated with a second priority, the first priority being a higher priority than the second priority.

13. A system comprising:
a processor circuit implementing virtual machines; and
a co-processor circuit including a virtualization management circuit and function blocks, the virtualization management circuit to receive data indicating the virtual machines implemented by the processor to be provided access to hardware functionality implemented in the function blocks, and to generate a mapping between the virtual machines and the function blocks to provide the virtual machines access to the hardware functionality implemented in the function blocks, the mapping indicating each virtual machine associated with a corresponding virtual function, each virtual function associated with one or more of the physical functions, and each of the one or more physical functions associated with the one or more function blocks, wherein the mapping is based on characteristics of the virtual machines, wherein the one or more physical functions includes a first physical function and a second physical function, the first physical function mapped to a first function block, the second physical function mapped to the first function block and a second function block, and wherein the first function block provides a first hardware functionality and the second function block provides a second hardware functionality, and the virtualization management circuit is to update the mapping based on a reconfiguration of the second function block to provide a third hardware functionality different than the second hardware functionality.

14. The system of claim 13, wherein the characteristics of the virtual machines include a customer identifier.

15. The system of claim 14, wherein virtual machines associated with a first customer identifier are mapped to a first group of virtual functions, the first group of virtual functions mapped to the first physical function, and virtual machines associated with a second customer identifier are mapped to a second group of virtual functions, the second group of virtual functions mapped to the second physical function.

* * * * *